(No Model.)  3 Sheets—Sheet 1.
G. W. PRICE.
MOTOR FOR VESSELS.
No. 568,117. Patented Sept. 22, 1896.

(No Model.) 3 Sheets—Sheet 3.

G. W. PRICE.
MOTOR FOR VESSELS.

No. 568,117. Patented Sept. 22, 1896.

Witnesses:
Remington Sherman
Alexander A. Stephenson Jr.

Inventor:
George W. Price
by Geo. H. Remington & Co.
Att'ys.

UNITED STATES PATENT OFFICE.

GEORGE W. PRICE, OF PROVIDENCE, RHODE ISLAND, ASSIGNOR TO THE OCEAN POWER PROPELLER COMPANY, OF SAME PLACE.

MOTOR FOR VESSELS.

SPECIFICATION forming part of Letters Patent No. 568,117, dated September 22, 1896.

Application filed January 15, 1896. Serial No. 575,553. (No model.)

*To all whom it may concern:*

Be it known that I, GEORGE W. PRICE, a citizen of the United States, residing at Providence, in the county of Providence and State of Rhode Island, have invented certain new and useful Improvements in Motors for Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in mechanism or apparatus for deriving power from the waves or motion of bodies of water and at the same time utilizing such derived power for propelling vessels; and it consists, essentially, in the novel construction and combination of the parts constituting the device, all as will be more fully hereinafter set forth and claimed.

My invention is more particularly adapted to "freighters" or other slowly-sailing vessels, and may be used as auxiliary to the sails or steam, or it may be employed independently of them, as desired. In carrying out this invention the motion imparted to the vessel by the waves is, by means hereinafter described, utilized to compress air, the latter being subsequently introduced into a suitable engine, where its energy is employed to rotate a propeller-shaft, thereby propelling the boat or vessel in an automobile manner.

Figure 1:
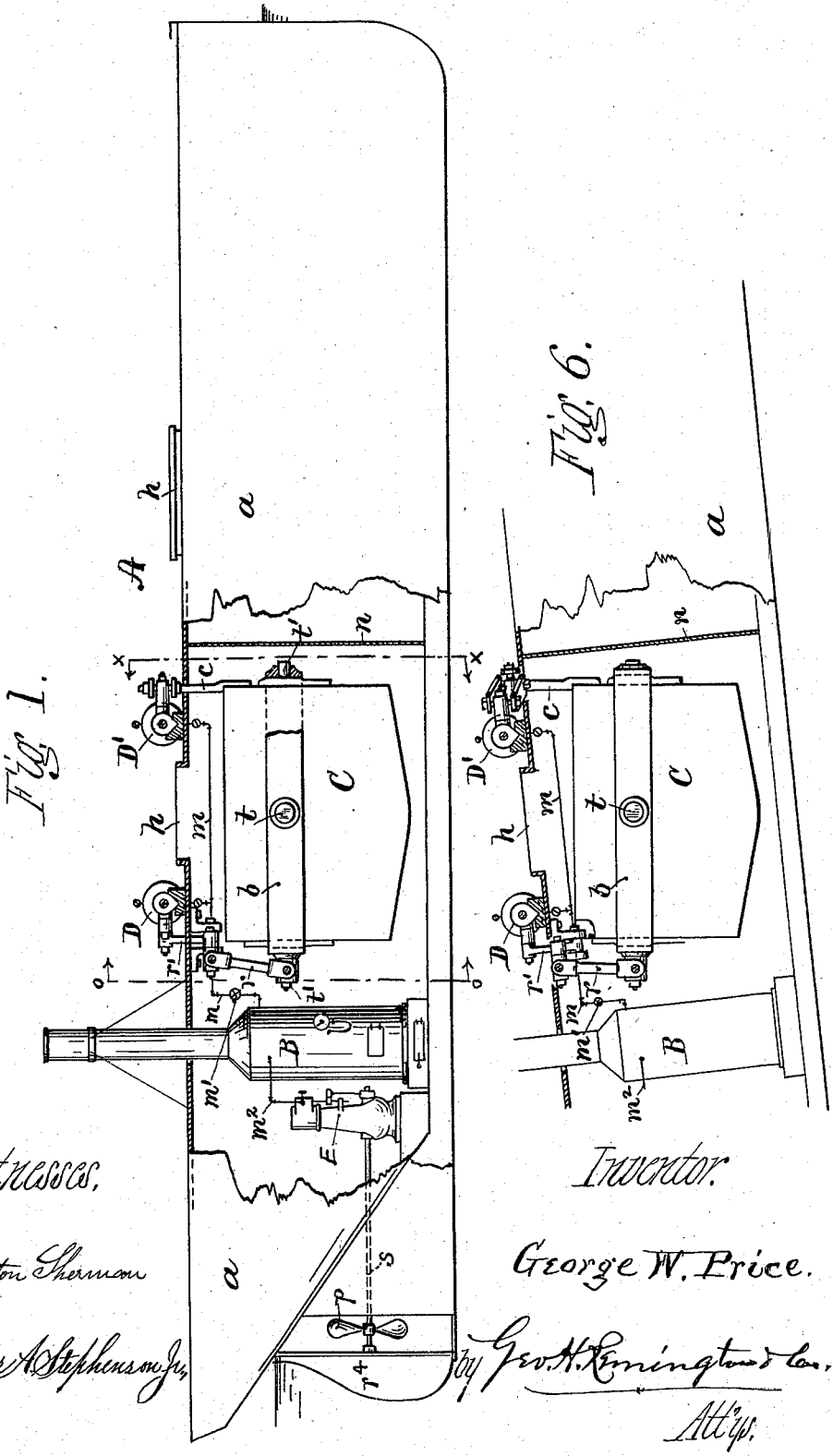
Figure 2:
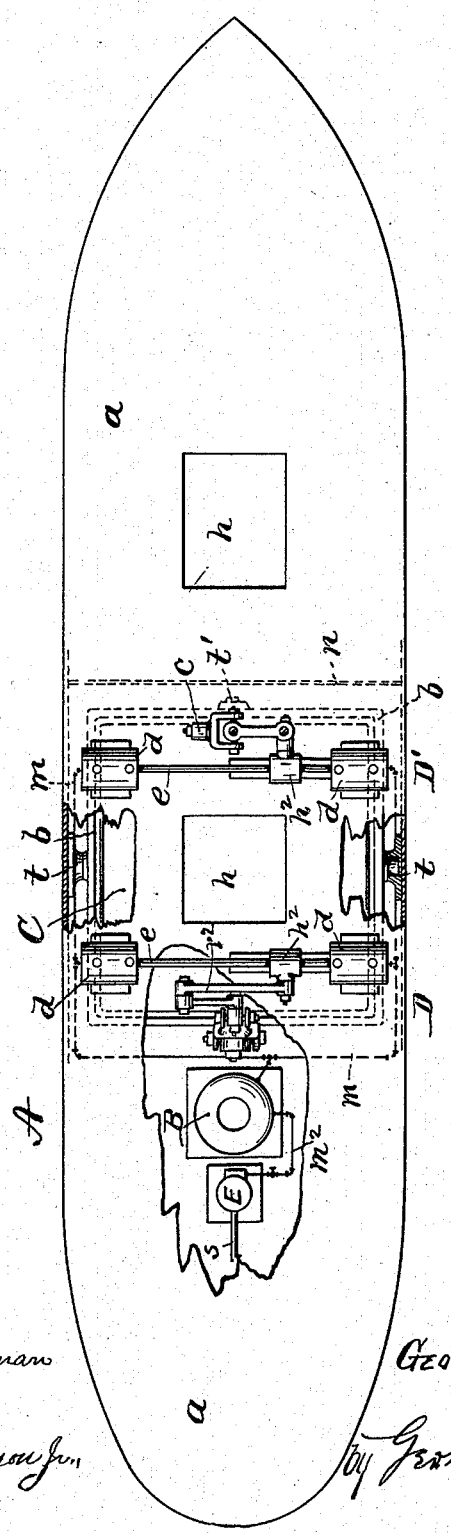
Figure 3:
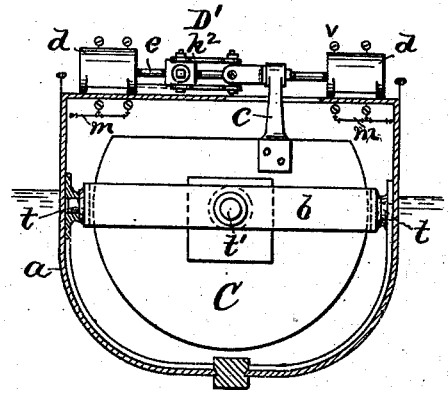
Figure 4:
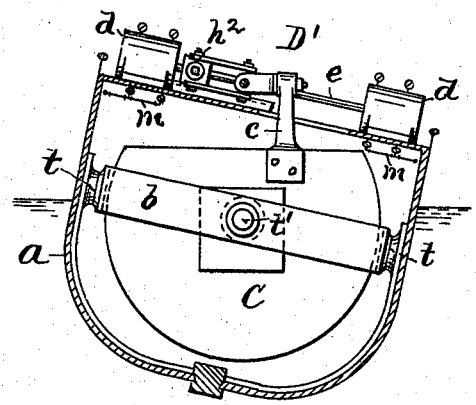
Figure 5:
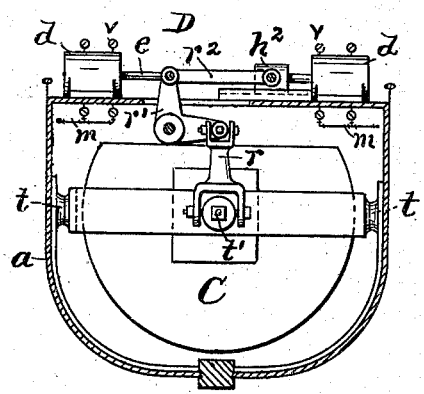
Figure 7:
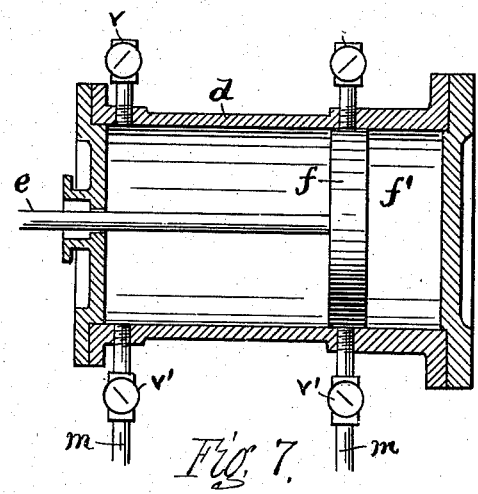

In the accompanying three sheets of drawings, Figure 1 is a side elevation, in partial section, of a boat embodying my invention. Fig. 2 is a plan view of it, portions of the deck being broken away. Fig. 3 is a transverse section taken on line *x x* of Fig. 1, the boat being level or on an even keel. Fig. 4 is a similar view showing the center of gravity of the boat changed, as in rolling, the corresponding or forward air-compressor being at work. Fig. 5 is a cross-sectional view taken on line *o o* of Fig. 1, showing the after air-compressor, &c. Fig. 6 is a partial central longitudinal section showing the relation of the parts when the boat is pitching; and Fig. 7 is a longitudinal sectional view, enlarged, taken through the center of one of the air-compressing cylinders.

I would state here that in the drawings I have represented a single-deck freight boat or barge of simple construction provided with my improvement. It is obvious, however, that other types of vessels may be rendered automobile by means of my invention, whereby the oscillatory movements of the vessel resulting from the action of the waves upon it is utilized for its propulsion. I may further state that the relative proportions and arrangement of the parts as drawn may be modified. The drawings represent one form of apparatus or instrumentality through which the motions of the vessel are converted into useful work.

In order to insure sufficient motive power for the vessel when the latter is in smooth water or when docking, I prefer to provide it with a steam-boiler, as B, the steam from which passes into the engine E, which in turn actuates the propeller-shaft *s* in a well-known manner.

In carrying out the invention forming the subject of this application for patent, A, referring to the drawings, indicates a vessel complete embodying my improvement. The hull *a* is or may be constructed substantially as usual, except as to the swinging or self-leveling weight or tank C. The capacity of this tank I prefer to make equal to one-third to two-fifths of the entire carrying capacity of the vessel. It, the tank, may be located as far aft as possible, a transverse bulkhead *n* separating it from the forward part of the boat. The tank C is made very strong and tight and is capable of being weighted with a portion of the freight or cargo, or when the vessel is sailing light, or practically without cargo, the tank may be charged with water or other suitable ballast.

The tank C is mounted on universal or gimbal joints journaled in a swinging yoke or frame *b*, extending freely around the tank. As drawn, the yoke *b* is provided with the two oppositely-located pins or trunnions *t*, journaled in suitable bearings secured to the vertical sides of the vessel. The forward and after side walls of tank C have trunnions *t'* secured thereto, the same being journaled in the yoke *b*, the two sets of trunnions or joints being arranged in a horizontal plane and at right angles to each other. Thus it will be seen that the oscillations of the vessel proper, within fixed limits, are not transmitted to the weighted tank; or, in other words, the tank remains substantially level and stationary with respect to the rolling and pitching action of the hull $a$ of the vessel.

The deck of the vessel is provided with suitably-arranged hatchways $h$, one being located directly over the tank. The freight or cargo is passed through these hatches, as in lading and unlading.

In the drawings I have represented two sets of air-compressing machines D D'. These are arranged transversely of the vessel, or athwart ship, each set being duplex and secured to the deck. The forward compressor D' is, as drawn, employed for utilizing the rolling motions of the boat for compressing air, and the other or after compressor D is actuated by the pitching motions of the boat. The air-compressor cylinders $d$ are constructed substantially as common, each having suitable inlet-valves $v$ and outlet-valves $v'$. The two cylinders of each set are provided with the pistons $f$ and a piston-rod $e$, uniting the two. The piston-rod of compressor D' is provided with a cross-head $h^2$, which in turn is suitably jointed or connected to the vertical bracket $c$, secured to the contiguous upper part of the tank. The said after compressor D is substantially the same as the forward one. It, too, is provided with a cross-head $h^2$. To the latter is jointed a link $r^2$, which is connected to an arm of a bell-crank lever $r'$, the other arm being suitably jointed to a link $r$, which in turn is jointed to the after trunnion or journal $t'$. The said lever $r'$ is secured to the under side of the deck, the whole being so arranged that any movement of the boat longitudinally in pitching will be resisted by the practically stationary tank or weight C, thereby causing the lever $r'$ to vibrate or rock on its fulcrum and imparting motion to the piston-rod $e$ of the compressor.

The several outlet-valves $v'$ of all the air-compressors are connected by a system of piping $m$ for conducting the compressed air into a steam-boiler or other suitable reservoir B, one or more suitable stop-valves $m'$ being located in said piping for obvious purposes. I prefer to provide the vessel with an ordinary steam-boiler, as B, located aft of the tank C. The steam generated in said boiler may be employed independently of or as an auxiliary to the compressed air for propelling the vessel. The steam is taken from the boiler through valved piping $m^2$ to the cylinder of a suitable engine E, the latter being arranged to rotate a shaft $s$, having a propeller $p$ on its rear end, substantially as usual.

From the foregoing description it will be obvious that when a vessel, as A, provided with my improvement is on an even keel, substantially as shown in Figs. 1 and 3, no movement of the air-compressors will take place. When, however, the motion of the water is sufficient to roll the vessel in any degree to port or to starboard, as shown in Fig. 4, such oscillatory movement will force the pistons in the corresponding cylinders, thereby compressing the air in them and forcing it via pipe $m$ into the reservoir B, it being borne in mind that the stability of the weight or tank C is maintained by means of the great weight contained therein. Consequently the bracket $c$, being a part of the tank, is practically unyielding and resists the thrust of the cross-head, &c., and resulting in the movement of the piston and compressing the air, as just stated. A similar result follows the action of the vessel when it is pitching or oscillating up and down. (See Fig. 6.) In this case the after compressor D operates to compress the air, the other compressor D' meanwhile being inactive; or it may be possible that the motions of the vessel would, in some instances, produce a simultaneous or joint action of both compressors.

In order to provide for excessive oscillatory movements of the vessel, I may extend the outer or rear ends of the several cylinders $d$ beyond the valves $v\ v'$ to form cushioning-chambers $f'$. (See Fig. 7.) By means of this arrangement the confined air therein forms a cushion and prevents the mechanism from being subjected to sudden shocks or strains. When the piston is thus resisted by the cushioned air, any further angular movement of the vessel in that direction will then cause the whole, including the tank, to move in unison until the limit of oscillation is reached. The tank will assume its normal position when the vessel passes the corresponding point on the return movement. Now, when at sea, the oscillatory movements of the vessel will, through the normally-stationary or self-leveling weight C and the several connections and compressors D D', operate to compress volumes of air automatically in proportion to the number and extent of such oscillations and force it through pipes $m$ into the reservoir or boiler B. From the latter the said air under pressure is introduced through pipe $m^2$ into the cylinder of the engine E. The expansive force of the air then operates to rotate the propeller-shaft $s$ substantially the same as though steam were used, thereby propelling the boat at a rate of speed dependent upon the oscillatory movements of the vessel, as before stated. The boat may be steered substantially as usual by means of a rudder $r^4$, located at the rear of the propeller.

In case more speed or power is required than is developed by the compressed air alone, steam may be combined with the compressed air and used in the engine, or the steam and air may be used in different engines, the combined power being transmitted to the propeller-shaft or other driving device.

I do not claim, broadly, the method of propelling a vessel by means of stored air compressed by the motion of the vessel, as devices having such object in view have been invented prior to my present invention.

I claim as my invention and desire to secure by United States Letters Patent—

In a motor for vessels, the combination of a pair of air-compressing cylinders secured to the vessel on either side of its center or median line, suitable normally stationary pistons mounted in said cylinders, a piston-rod secured to and uniting said pistons, a swinging weight or tank C, connections linked to and uniting the said tank and piston-rod, whereby the oscillatory movements of the vessel cause the said cylinders to move back and forth over the said normally stationary pistons thereby compressing the air, a reservoir for the compressed air, a propeller, an engine connected with the propeller, and suitably-valved connections or piping interposed between the said engine, reservoir and air-compressor cylinders, substantially as hereinbefore described.

In testimony whereof I have affixed my signature in presence of two witnesses.

GEORGE W. PRICE.

Witnesses:
GEO. H. REMINGTON,
REMINGTON SHERMAN.